_United States Patent Office_

3,325,306
Patented June 13, 1967

3,325,306
HYDROPHOBIC POLYMERS COATED WITH A HYDROCARBON POLYISOCYANATE REACTED WITH A DIHYDROXY ORGANIC TERTIARY AMINE
John R. Caldwell, Kingsport, Tenn., assignor to Eastman Kodak Company, Rochester, N.Y., a corporation of New Jersey
No Drawing. Filed Nov. 12, 1963, Ser. No. 323,100
19 Claims. (Cl. 117—138.8)

This invention relates to improvements in the surface of hydrophobic polymer structures. More particularly, this invention relates to the application of coatings of certain specific compounds to the surfaces of structures such as films, fibers, sheets, and the like prepared from hydrophobic resins whereby there is provided a unitary member having improved surface properties.

An object of this invention is to improve the surface characteristics of hydrophobic polymer structures, whereby to enhance their receptivity to printing inks and the like and to inhibit the accumulation of electrostatic charges thereon.

An object of this invention is a unitary member having improved surface characteristics comprised of a hydrophobic polymer structure such as a film or fiber and a coating of a specific compound thereon, the coating being firmly bonded to the surface of the hydrophobic polymer structure.

Another object of this invention is the application of a permanent antistatic finish to films and fibers prepared from hydrophobic polymers.

A further object of this invention is a unitary member comprised of a hydrophobic polymer structure and a highly adherent coating thereon, which coating is receptive to printing inks, decorative coatings, dyes, and the like.

A still further object of this invention is a process for coating hydrophobic, solvent-resistant types of photographic film base whereby the adhesion of other materials thereto, such as gelatin and poly (vinyl alcohol), is improved substantially.

Other objects of this invention will, in part, be obvious and will, in part, appear hereinafter.

For a complete understanding of this invention reference is made to the following detailed description.

The objects of this invention are accomplished by applying to the surface of a structure prepared from a hydrophobic polymer a compound that contains an amino group and at least two isocyanate groups. The isocyanate groups serve to bond the compound to the surface to which it is applied so that, for practical purposes, a substantially permanent coating of the compound is obtained. The amino group, as will be set forth in more detail hereinafter, can be present as a tertiary amino group or as an acyl derivative or as a sulfonyl derivative of a secondary amine.

The coating compound of this invention can be applied to hydrophobic polymer structures such as filaments, fibers, sheets, films, molded articles and the like to provide a unitary member having improved surface characteristics such as improved receptivity to dyes, printing inks, coatings of polymeric materials and the like. In some instances the unitary member has improved resistance to the development of electrostatic charges.

The process of this invention is of a particular value for the treatment of structures prepared from polymers that are hydrophobic and that have a moisture content of less than about 4 percent by weight and especially those having a moisture content of less than about 2 percent by weight. Examples of such polymers include the polyesters such as polyethylene terephthalate and the polyester derived from terephthalic acid and 1,4-cyclohexanedimethanol, polycarbonates, polystyrene, polyolfins such as polyethylene and polypropylene, poly (vinyl chloride), poly (vinylidene chloride), cellulose triacetate, cellulose tripropionate, and cellulose acetate butyrate.

The coating compounds of this invention are derived by reacting a compound containing two or more isocyanate groups with a dihydroxy compound having the structural formula

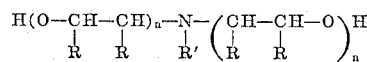

wherein $n$ is an integer of 1 to 10; R is selected from at least one of the group consisting of hydrogen, methyl, and ethyl; and R' is a straight chain or branched chain alkyl containing 1 to 18 carbon atoms, such, for example, as methyl, ethyl, propyl, isopropyl, n-butyl, isobutyl, t-butyl, n-pentyl, isoamyl, n-hexyl, isohexyl, n-heptyl, octyl, nonyl, decyl, hendecyl, dodecyl, pentadecyl, hexadecyl, heptadecyl, and octadecyl; aryl such as phenyl and methyl phenyl; and benzyl. R' can also have the structure R″CO— wherein R″ is the same as R' or R' can have the structure R‴ SO$_2$— wherein R‴ is selected from the group consisting of alkyl containing from 1 through 6 carbon atoms such as methyl, ethyl, propyl, isopropyl, butyl, isobutyl, t-butyl, pentyl, isoamyl, and hexyl; and aryl containing 6 to 10 carbon atoms such as phenyl and naphthyl.

Examples of the above compounds, wherein $n$ is 1, are N-phenyl diethanolamine, N-methyl diethanolamine, N-ethyl diethanolamine, N-isopropyl diethanolamine, and N-butyl diethanolamine.

Dihydroxy compounds of the above formula can be derived by known methods. Thus, for example, one mole of aniline or one mole of a primary aliphatic amine can be reacted with 2 to 20 moles of ethylene oxide to produce.

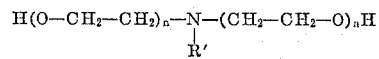

In this case R' will be phenyl or alkyl.

In another example one mole of diethanolamine is reacted with one mole of p-toluenesulfonyl chloride to provide

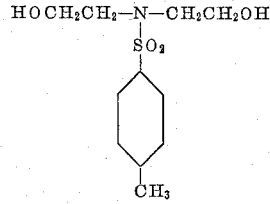

The halides or anhydrides of acetic acid, benzoic acid, cyclohexanecarboxylic acid, and the like can be reacted with diethanolamine to produce the related carboxamide.

Higher alkylene oxides, such as propylene oxide and butylene oxide, can be used to produce dihydroxy compounds suitable for reaction with isocyanate compounds containing two or more isocyanate groups.

For example, 4 moles of propylene oxide and one mole of aniline will produce the compound

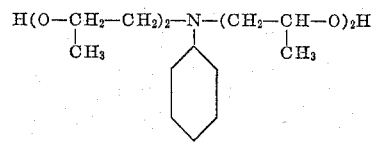

Six moles of 1,2-butylene oxide and one mole of methyl amine will provide the compound

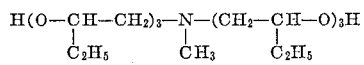

Eight moles of 2,3-butylene oxide and one mole of ethyl amine will provide the compound

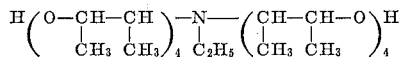

The coating compounds employed in this invention are obtained by reacting a molecular proportion of the dihydroxy compound, as above described, with about two molecular proportions of an isocyanate compound that contains at least two isocyanate groups. Examples of suitable isocyanates include hexamethylenediisocyanate, decamethylenediisocyanate, octamethylenediisocyanate, 1,4-cyclohexylenediisocyanate, 2,4-tolylenediisocyanate, α,α'-xylenediisocyanates, 4,4'-diphenylmethanediisocyanate, 1,5 - naphthalenediisocyanate, naphthalenetriisocyanates, and diphenyltriisocyanates. Also isocyanates containing ether, sulfide, or sulfone groups can be employed. Such compounds are represented by the formula

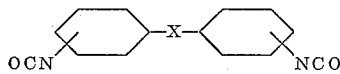

where —X— is —O—, —S—, or —SO$_2$—.

Other suitable compounds containing 2 or 3 isocyanate groups are described in Ann. 562, 75 (1949).

When a diisocyanate compound is used, it is preferred to react at least two moles thereof with one mole of the dihydroxy compound. As much as 2.5 or 3.0 moles of the diisocyanate compound can be used if desired. When a compound containing three isocyanate groups is used, it is preferred to react from about 1.5 to 2.0 moles thereof with one mole of the dihydroxy compound.

In preparing the coating compounds for use in carrying out this invention, up to about 80 mole percent of the dihydroxy compound can be replaced with a glycol or a mixture of glycols such, for example, as aliphatic glycols, ether glycols, and alicyclic glycols. Examples of specific glycols include ethylene glycol, 1,3-butylene glycol, 1,4-butylene glycol, 1,5-amylene glycol, 1,6-hexylene glycol, diethylene glycol, triethylene glycol, 1,4-cyclohexanedimethanol, and 2,2,4,4-tetramethyl 1,3-cyclobutane diol.

The reaction between the isocyanate compound and the dihydroxy compound is carried out preferably in the presence of an inert solvent at a temperature of from about 25° C. to 100° C for a period of time of from about 30 minutes to 24 hours. The amount of inert solvent used can be varied over a relatively wide range, usually about 50% to 800% by weight of solvent based on the total weight of the reactants is satisfactory.

Any solvent can be used that is inert toward the isocyanate groups under conditions of reaction and conditions of use. Suitable solvents include the esters such as ethyl acetate, butyl acetate, isobutyl propionate, and methyl benzoate; the ketones such as acetone, methylethyl ketone, diisopropyl ketone, and cyclohexanone; the chlorinated hydrocarbons such as methylene chloride, ethylene dichloride, chloroform, perchloroethylene, and chlorobenzene; the ethers such as diethyl ether, diisopropyl ether, dioxane, tetrahydrofuran, and 1,3-dioxolane; the aromatic hydrocarbons such as benzene, toluene, and xylene; and the tertiary alcohols such as t-butyl alcohol and t-amyl alcohol.

The coating compounds of this invention are applied to hydrophobic polymer structures, preferably from solution. Suitable solvents include those set forth above. Preferred solutions will contain 1% to 10% by weight of solids. Solutions comprised of a greater amount of coating compound can be used if desired.

Application of solution of the coating compound to the surface of the structure to be coated can be accomplished by any convenient method such as dipping, spraying, brushing, roll coating and the like. The amount of coating compound applied will depend on the type of coating and the effect desired. The applied coating can have a thickness of the order of about 0.001 mil to 2 mils and more if desired. After application of the solution the coated structure is heated at a temperature of from about 80° C. to 200° C. for 5 seconds to 4 hours to promote adhesion of the applied coating compound to the structure's surface and to remove the solvent.

The isocyanate groups present in the coating composition of this invention can be blocked or masked temporarily by reaction with certain active hydrogen compounds. See Ann. 562, 205 (1949). By using suitable blocking or terminating agents, coatings can be applied from water or mixtures of water with organic solvents. At elevated temperatures the complex dissociates to release the isocyanate groups in a reactive form. The chain termination or blocking of the polymer is a well known reaction in polymer chemistry. In this step, any terminal reactive groups of the polymer are reacted with a nonchain extending compound which inactivates these groups. In the instant compounds, any reactive terminal group would be the isocyanate groups. These compounds are inactivated by reaction with a nonchain extending compound having an active hydrogen. Chain terminating agents include the alcohols, water, secondary amines, acids, inorganic salts having an active hydrogen such as sodium bisulfite, mercaptans, amides, alkanolamines, oximes, phenols, malonic esters, acetoacetic esters, and the like.

The following examples are illustrative of this invention. All parts are by weight unless otherwise indicated.

EXAMPLE I

To 70 parts of dioxane in a reaction vessel there are added 2.08 parts of triethylene glycol, 0.63 part of N-phenyl-diethanol amine and 6.04 parts of 2,4-tolylenediisocyanate. The mixture is heated for one hour at a temperature of 80° C. to 90° C. The resulting solution is diluted further with benzene to a solids content of 3% and applied to films of poly (ethylene terephthalate), polyethylene, and cellulose triacetate. The coated films are air dried for 15 minutes, and then heated at 80° C. for 2 hours. The applied coating compound shows excellent adhesion to all films, even when the coated films are bent or flexed. Gelatin and poly (vinyl alcohol) have good adhesion to the coated films. The coated films dye readily with acid wool dyes.

EXAMPLE II

Example I is repeated with the exception that N-methdiethanolamine is used in place of the N-phenyldiethanolamine. The results obtained are substantially the same as those obtained in Example I.

EXAMPLE III

One mole of N-butyldiethanolamine and 2 moles of 4,4'-diphenylmethanediisocyanate are mixed in a reaction vessel with dry butyl acetate. The mixture is heated at 90° C. to 100° C. for 30 minutes. The solids content of the resulting solution is 5%. Films of polyethylene, polypropylene, polystyrene, polyacrylonitrile, cellulose triacetate, Bisphenol A polycarbonate, poly (ethylene terephthalate) and poly (1,4-cyclohexanedimethylene terephalate) are dipped into the solution and removed. The treated films are heated at 70° C. to 80° C. for 15 minutes to remove the solvent from the applied coating and to promote adhesion of the coating compound to the film surfaces. Adhesion of the coating is good in all cases. The coated films have a strong affinity for acid wool dyes. They take up Cu, Cr, Co, Ni, and Zn ions from solution. Films treated with cobalt, chromium, and nickel solutions can be dyed with mordant dyes. The coated films can be printed readily with decorative inks and lacquers and the adhesion thereof to the coated film is excellent. Coatings of rubber, poly (vinylidene chloride), gelatin, and poly (vinyl alcohol) show improved adhesion to the coated films.

EXAMPLE IV

The reaction product of Example III is applied from solution to fibers prepared from polyethylene, polypropylene, polyacrylonitrile, poly (ethylene terephalate), and poly (1,4 - cyclohexanedimethylene terephthalate). The treated fibers show improved adhesion for natural rubber and synthetic rubbers. They are readily printed with acid wool dyes. Quaternization of the applied coating compound with benzyl chloride or methyl toluenesulfonate results in improved antistatic properties.

EXAMPLE V

One mole of N,N-di(2-hydroxyethyl)-p-toluenesulfoneamide and 3 moles of 4,4'-diphenylether diisocyanate are heated at 70° C. to 80° C. for 1 hour in dry dioxane. The resulting solution is diluted to a 3% solids content with methyl ethyl ketone and applied to films of polyethylene, polypropylene, polystyrene, poly (ethylene terephthalate) and poly (1,4-cyclohexanedimethylene terephthalate). The treated films are heated at 70° C. to 80° C. for 30 minutes during which time the solvent is removed from the applied coating. The coated films are printed with cellulose acetate dyes and the applied printing adheres extremely well to the coated films. Poly (ethylene terephthalate) fibers treated with the solution of this example are heated at 100° C. to 110° C. for 15 minutes. The coated fibers have improved adhesion for natural rubber and synthetic rubber coatings. The coated fibers dye well with cellulose acetate dyes.

EXAMPLE VI

One mole of oleic amide is treated with 10 moles of ethylene oxide to provide a product having the formula

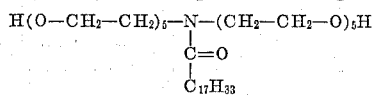

One mole of this product and four moles of hexamethylenediisocyanate are heated in tetrahydrofuran for 1 hour at a temperature that ranges between 40° C. and 50° C. The resulting solution is adjusted to a solids content of 4% by adding additional tetrahydrofuran. Films are treated with this solution in a manner similar to that described in Example III. The films have excellent adhesion for gelatin, poly (vinyl alcohol), and printing inks. Poly (ethylene terephthalate) fibers treated with the solution and dried have good adhesion for coatings of rubber and poly (vinyl butyryl).

EXAMPLE VII

One mole of N-phenyldiethanolamine and two moles of 2,4-tolylenediisocyanate are heated in dioxane for 1 hour during which time the temperature varies between 90° C. and 100° C. Two moles of phenol are added and heating is continued for 2 hours. This treatment with phenol blocks the terminal isocyanate groups forming phenylurethane groups. The resulting solution is poured into water containing sodium oleyl sulfate and a stable emulsion is produced. Poly (ethylene terephthalate) fibers are passed through the emulsion and pressed so that the add-on is 4% by weight based on the weight of the fibers, on a dry basis. The treated fibers are heated at a temperature of 110° C. to evaporate and remove therefrom substantially all the water and then heated at 210° C. for 3 minutes to remove therefrom phenol. The coated fibers have excellent adhesion for natural and synthetic rubbers. Similar results are obtained on fibers prepared from poly (1,4-cyclohexanedimethylene terephthalate) and poly (ethylene 2,6 - naphthalenedicarboxylate). This blocked compound is useful also for the treatment of polyester films using aqueous dispersions thereof. The coated fibers are treated with a solution of diazotized p-nitroaniline which, when reacted with the aniline nucleus in the coating compound, produces a colored coating.

EXAMPLE VIII

Two moles of diphenyltriisocyanate are heated with one mole of

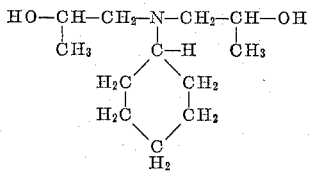

in dioxolane at 50° C. to 60° C. for 2 hours. The concentration of solids in the resulting solution is 5% by weight. The solution is applied to films similar to those in Example III and the coated films heated as in Example III. The coated films have substantially the same properties as those of Example III.

A wide variety of valuable surface properties can be imparted to hydrophobic polymer structures using the coating compounds of this invention. The coating compounds that contain tertiary amino groups are of particular value. In these compounds R' is alkyl, cycloalkyl, aryl, or benzyl. The nitrogen has basic properties and is capable of being quaternized with various sulfates, sulfonates, and halides. The tertiary amino group has the ability to form complexes with Cu, Cr, Ni, Co, and Zn ions. These coating compounds also have ion-exchange properties and can form salts with negative ions. They have a strong affinity for acid wool dyes. When R' is aryl, such as phenyl, the applied coating compound can react with diazonium salts to give colored coatings that are permanently attached to the hydrophobic polymer structure.

Coating compounds in which R' is acyl or sulfonyl have a strong affinity for disperse dyes and premetallized dyes. They also are readily wetted by printing inks, lacquers, and other decorative or protective coatings, thus promoting adhesion thereof. Films and fibers treated in accordance with this invention show improved adhesion for natural rubber, synthetic rubber, and vinyl polymers such as poly (vinylidene chloride), polyacrylates, and the like.

It is to be understood that the above description of the invention and the specific working examples are illustrative of this invention and not in limitation thereof.

I claim:
1. A unitary member comprised of a hydrophobic polymer structure and a highly adherent coating in direct contact with an unaltered surface of the structure said coating consisting essentially of a compound derived by the reaction of
 (A) a hydrocarbon isocyanate compound selected from the group consisting of hydrocarbon diisocyanate compounds and hydrocarbon triisocyanate compounds said compound being reacted in an amount of from about 1.5 to about 2.0 mole proportions when it is a triisocyanate and from about 2.0 to about 3.0 mole proportions when it is a diisocyanate and
 (B) one mole proportion of an amine compound having the structural formula

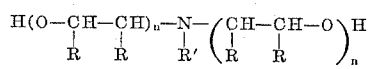

wherein
 n is an integer of 1 through 10;
 R is selected from at least one of the group consisting of
  hydrogen,
  methyl, and
  ethyl; and R' is selected from the group consisting of
- alkyl containing from 1–18 carbon atoms,
- cycloalkyl containing from 6–10 carbon atoms,
- aryl,
- benzyl,
- R"CO— wherein R" is selected from the group consisting of
  - alkyl containing from 1–18 carbon atoms,
  - cycloalkyl containing from 6–10 carbon atoms,
  - aryl, and
  - benzyl, and
- R'''SO$_2$— wherein R''' is selected from the group consisting of
  - alkyl containing 1–6 carbon atoms,
  - phenyl, and
  - naphthyl.

2. The unitary member of claim 1 wherein the hydrophobic polymer structure is a polyester structure.

3. The unitary member of claim 2 wherein the polyester structure is a fiber.

4. The unitary member of claim 2 wherein the polyester structure is a film.

5. The unitary member of claim 1 wherein the hydrophobic polymer structure is a polyolefin structure.

6. The unitary member of claim 5 wherein the polyolefin structure is a fiber.

7. The unitary member of claim 5 wherein the polyolefin structure is a film.

8. A unitary member in accordance with claim 1 wherein said hydrocarbon isocyanate compound (A) and said amine compound (B) are as follows:
(A) a hydrocarbon diisocyanate and
(B) N-phenyldiethanolamine.

9. A unitary member in accordance with claim 8 wherein the hydrophobic polymer structure is a poly(ethylene terephthalate) structure.

10. A unitary member in accordance with claim 8 wherein the hydrophobic polymer structure is a polyethylene structure.

11. A unitary member in accordance with claim 1 wherein said hydrocarbon isocyanate compound (A) and said amine compound (B) are as follows:
(A) a hydrocarbon diisocyanate and
(B) N-methyldiethanolamine.

12. A unitary member in accordance with claim 11 wherein the hydrophobic polymer structure is a poly(ethylene terephthalate) structure.

13. A unitary member in accordance with claim 11 wherein the hydrophobic polymer structure is a polyethylene structure.

14. A unitary member in accordance with claim 1 wherein said hydrocarbon isocyanate compound (A) and said amine compound (B) are as follows:
(A) a hydrocarbon diisocyanate and
(B) N,N-di(2-hydroxyethyl)-p-toluenesulfoneamide.

15. A unitary member in accordance with claim 14 wherein the hydrophobic polymer structure is a poly(ethylene terephthalate) structure.

16. A unitary member in accordance with claim 14 wherein the hydrophobic polymer structure is a polyethylene structure.

17. A unitary member in accordance with claim 1 wherein said hydrocarbon isocyanate compound (A) and said amine compound (B) are as follows:
(A) a hydrocarbon diisocyanate compound, and
(B) a compound having the structure

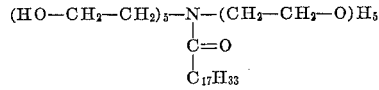

18. A unitary member in accordance with claim 17 wherein the hydrophobic polymer structure is a poly(ethylene terephthalate) structure.

19. A unitary member in accordance with claim 17 wherein the hydrophobic polymer structure is a polyethylene structure.

References Cited

UNITED STATES PATENTS

| | | | |
|---|---|---|---|
| 2,333,639 | 11/1943 | Christ et al. | 260—75 |
| 2,763,603 | 9/1956 | Skinner | 208—254 |
| 2,799,659 | 7/1957 | Mayhew et al. | 252—392 |
| 3,050,432 | 8/1962 | Weinbrenner et al. | 156—96 |
| 3,152,920 | 10/1964 | Caldwell et al. | 117—138.8 |
| 3,198,692 | 8/1965 | Bridgeford | 117—138.8 |
| 3,252,943 | 5/1966 | Dankert et al. | 260—77.5 |

FOREIGN PATENTS 553,733   6/1943   Great Britain.

WILLIAM D. MARTIN, *Primary Examiner.*

R. HUSACK, *Assistant Examiner.*